US009516295B2

(12) United States Patent
Dal Mutto et al.

(10) Patent No.: US 9,516,295 B2
(45) Date of Patent: Dec. 6, 2016

(54) SYSTEMS AND METHODS FOR MULTI-CHANNEL IMAGING BASED ON MULTIPLE EXPOSURE SETTINGS

(71) Applicant: Aquifi, Inc., Palo Alto, CA (US)

(72) Inventors: Carlo Dal Mutto, Mountain View, CA (US); Abbas Rafii, Palo Alto, CA (US)

(73) Assignee: Aquifi, Inc., Palo Alto, CA (US)

( * ) Notice: Subject to any disclaimer, the term of this patent is extended or adjusted under 35 U.S.C. 154(b) by 0 days.

(21) Appl. No.: 14/788,078

(22) Filed: Jun. 30, 2015

(65) Prior Publication Data

US 2015/0381963 A1 Dec. 31, 2015

Related U.S. Application Data

(60) Provisional application No. 62/019,248, filed on Jun. 30, 2014.

(51) Int. Cl.

| *H04N 13/02* | (2006.01) |
|---|---|
| *H04N 5/265* | (2006.01) |
| *H04N 5/33* | (2006.01) |
| *H04N 9/04* | (2006.01) |
| *G06T 5/50* | (2006.01) |

(52) U.S. Cl.
CPC ............ *H04N 13/0214* (2013.01); *G06T 5/50* (2013.01); *H04N 5/265* (2013.01); *H04N 5/332* (2013.01); *H04N 9/045* (2013.01)

(58) Field of Classification Search
CPC ........................ H04N 13/0214; H04N 5/265

USPC ......................................................... 348/279
See application file for complete search history.

(56) References Cited

U.S. PATENT DOCUMENTS

| 7,379,100 | B2 | 5/2008 | Gokturk et al. | |
|---|---|---|---|---|
| 2006/0054782 | A1* | 3/2006 | Olsen | G02B 3/0062 250/208.1 |
| 2008/0266564 | A1* | 10/2008 | Themelis | G01J 3/2823 356/419 |
| 2011/0285866 | A1* | 11/2011 | Bhrugumalla | H04N 5/23235 348/218.1 |
| 2014/0193061 | A1* | 7/2014 | Miller | G06T 7/0012 382/133 |
| 2015/0156479 | A1* | 6/2015 | You | H04N 5/2254 348/47 |

\* cited by examiner

*Primary Examiner* — Gevell Selby
(74) *Attorney, Agent, or Firm* — Lewis Roca Rothgerber Christie LLP (57) ABSTRACT

A multi-channel image capture system includes: a multi-channel image sensor including a plurality of first pixels configured to detect light in a first band and a plurality of second pixels configured to detect light in a second band different from the first band; an image signal processor coupled to the multi-channel image sensor, the image signal processor being configured to: store a first plurality of capture parameters and a second plurality of capture parameters; control the multi-channel image sensor to capture a first image frame according to the first plurality of capture parameters; control the multi-channel image sensor to capture a second image frame according to the second plurality of capture parameters; and transmit the first image frame and the second image frame to a host processor.

18 Claims, 5 Drawing Sheets

SYSTEMS AND METHODS FOR MULTI-CHANNEL IMAGING BASED ON MULTIPLE EXPOSURE SETTINGS

CROSS-REFERENCE TO RELATED APPLICATIONS

This application claims the benefit of U.S. Provisional Patent Application No. 62/019,248, titled "SYSTEMS AND METHODS FOR RGB AND IR IMAGING BASED ON MULTIPLE EXPOSURE TIMES," filed in the United States Patent and Trademark Office on Jun. 30, 2014, the entire disclosure of which is incorporated herein by reference.

FIELD

Aspects of embodiments of the present invention relate to systems and methods for performing multi-channel imaging of a scene using multiple exposure settings.

BACKGROUND

Digital cameras that are able to capture images both in the visible spectrum and in an invisible light spectrum are useful in many contexts such as computer vision, image processing, and surveillance systems. The visible light (or "color") spectrum may include, for example, red, green, and blue (RGB) light. The invisible light spectrum may include, for example, a portion of the infrared spectrum. The color information can be used to provide photo-realistic images for user viewing or to perform computer vision tasks in situations illuminated in the visible spectra, such as in sunlight or under artificial illumination. The infrared information may be exploited in situations in which an application may benefit from full illumination control without affecting ambient visible illumination, such as video conferencing in low light scenarios and depth reconstruction systems supported by a coded light source (e.g., a projection source configured to project a pattern such as dots or lines onto a scene).

Figure 1A:
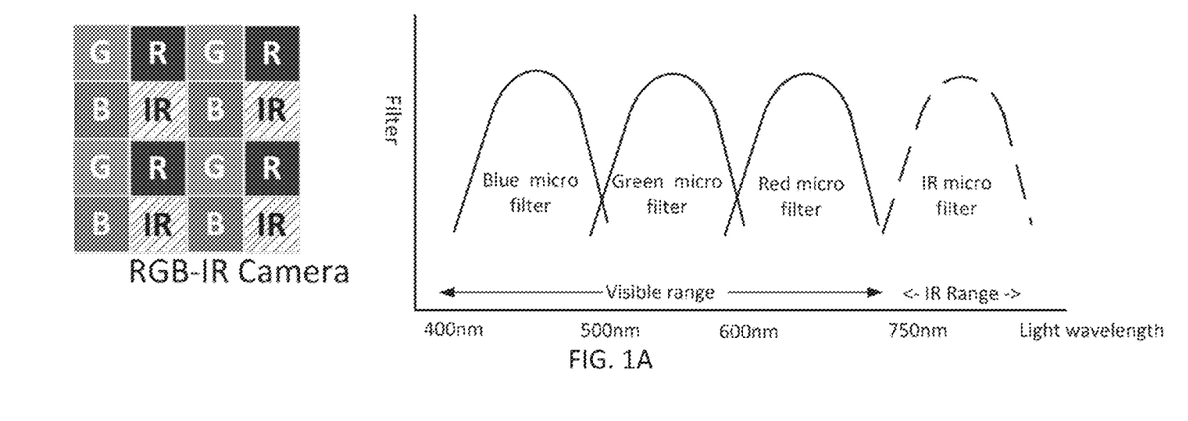
FIGS. 1A and 1B compare the architecture of a multi-channel RGB-IR camera sensor with that of a conventional RGB camera sensor.
Figure 1B:
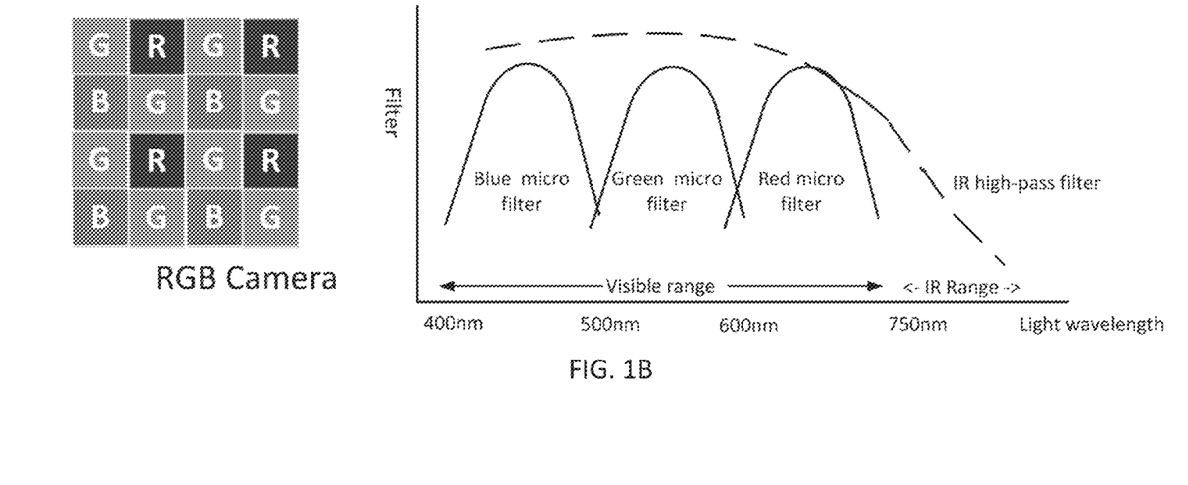

Sensors that are capable of detecting visible (e.g., RGB) and invisible (e.g., IR) information may be standard charged coupled device (CCD) or complementary metal oxide semiconductor (CMOS) sensors. FIGS. 1A and 1B compare the architecture of an RGB-IR image sensor with that of a conventional RGB image sensor. Generally, as shown in FIG. 1B, a conventional RGB camera sensor includes pixels arranged in a "Bayer layout" or "RGBG layout," which is 50% green, 25% red, and 25% blue. Band pass filters (or "micro filters") are placed above individual photodiodes for each of the green, red, and blue wavelengths in accordance with the Bayer layout. Generally, a conventional RGB camera sensor also includes an infrared (IR) filter or IR cut-off filter (formed, e.g., as part of the lens or as a coating on the entire chip) which further blocks signals in an IR portion of electromagnetic spectrum, as illustrated by the dashed line in FIG. 1B.

An RGB-IR sensor as illustrated in FIG. 1A is substantially similar to a conventional RGB sensor, but may include different color filters. For example, as shown in FIG. 1A, in an RGB-IR sensor, one of the green filters in every group of four photodiodes is replaced with an IR band-pass filter (or micro filter) to create a layout that is 25% green, 25% red, 25% blue, and 25% infrared, where the infrared pixels are intermingled among the visible light pixels. In addition, the IR cut-off filter may be omitted from the RGB-IR sensor, the IR cut-off filter may be located only over the pixels that detect red, green, and blue light, or the IR filter can be designed to pass visible light as well as light in a particular wavelength interval (e.g., 840-860 nm). An image sensor capable of capturing light in multiple portions or bands or spectral bands of the electromagnetic spectrum (e.g., red, blue, green, and infrared light) will be referred to herein as a "multi-channel" image sensor.

Some multi-channel image sensors allow substantially simultaneous or concurrent collection of both visible and invisible light in a scene. As such, when the scene is illuminated by a light source capable of emitting invisible light, the multi-channel sensor can provide both visible light information and invisible light from the reflected patterns for computer vision applications.

However, in many circumstances the luminance of the light in the visible light band (e.g., detected in a visible light channel) may be significantly different from the luminance of the light in the invisible light band (e.g., detected in an invisible light channel) and therefore, any given set of capture parameters (or exposure parameters) such as exposure time (shutter speed), aperture (f-stop), gain (ISO), and white balance, may fail to yield good results for either the visible channel (or channels) or the invisible channel (or channels). This may be especially true in circumstances where the RGB-IR sensor is coupled to an infrared illumination source that provides controlled illumination of the scene.

Generally, there are two different levels of optical filtering on a sensor: a coating filter, which is distributed on the system optics and which affects the measurements taken by all the pixels, and a per pixel filter which controls the particular portion of the spectrum (e.g., the particular band) transmitted to each pixel (e.g., filters to transmit the blue band to the blue pixels, the red band to red pixels, etc.).

Figure 1C:
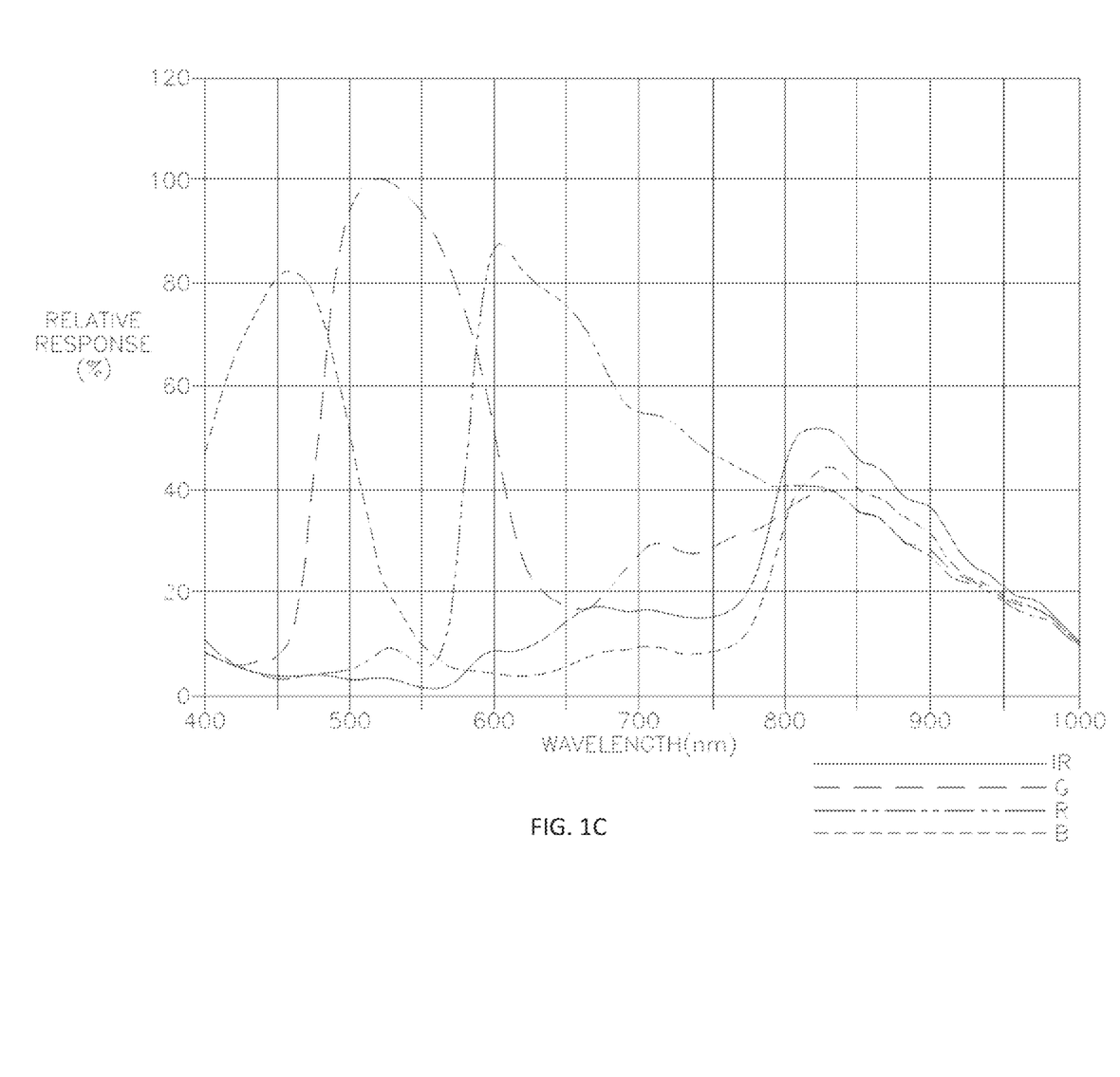
FIG. 1C is a graph illustrating the transmissivity of optical filters that may be implemented on different pixels of a multi-channel camera sensor.

FIG. 1C is a graph illustrating the transmissivity of optical filters that may be implemented on different pixels of a multi-channel camera sensor. As shown in FIG. 1C, there is cross-talk between the red, green, and blue channels and the infrared channel. In particular, the infrared channel has a non-zero response in the visible light range (e.g., about 400 nm to about 700 nm) and therefore the infrared channel would be affected by visible light illumination. Similarly, all of the red, green, and blue filters pass significant energy in the infrared band (e.g., about 760 nm to 1000 nm), so the red, blue, and green channels are affected by infrared illumination, that is, the red, blue, and green pixels would also detect infrared light in a scene. The effect of infrared illumination on the visible light channels would be particularly noticeable in situations where an infrared light source projected a pattern of dots or lines onto the scene because the pattern would appear in the captured light image despite being invisible to the naked eye.

SUMMARY

Embodiments of the present invention relate to a system and method for producing good quality 3D data under various ambient light conditions using multiple ordinary, low power sensors.

According to one embodiment of the present invention, a multi-channel image capture system includes: a multi-channel image sensor including a plurality of first pixels configured to detect light in a first band and a plurality of second pixels configured to detect light in a second band different from the first band; an image signal processor coupled to the multi-channel image sensor, the image signal processor being configured to: store a first plurality of capture parameters and a second plurality of capture parameters; control the multi-channel image sensor to capture a first image frame according to the first plurality of capture parameters; control the multi-channel image sensor to capture a second image frame according to the second plurality of capture parameters; and transmit the first image frame and the second image frame to a host processor.

The multi-channel image capture system may further include: a projection source configured to emit light in the first band and not in the second band; the host processor; and a memory storing instructions that, when executed by the host processor, cause the host processor to: control the projection source to emit light in the first band while the multi-channel image sensor captures the first image frame according to the first plurality of capture parameters.

The memory may further store instructions that, when executed by the host processor, cause the host processor to: control the projection source to stop emitting light in the first band while the multi-channel image sensor captures the second image frame according to the second plurality of capture parameters.

The projection source may be configured to emit no light in the second band.

The projection source may be configured to emit light at a first power level in the first band and to emit light at a second power level in the second band.

The multi-channel image capture system may further include a second multi-channel image sensor including a plurality of first pixels configured to detect light in the first band and a plurality of second pixels configured to detect light in the second band.

The multi-channel image capture system may further include a second image signal processor, the second image signal processor being configured to: store the first plurality of capture parameters and the second plurality of capture parameters; control the second multi-channel image sensor to capture a third image frame according to the first plurality of capture parameters; control the multi-channel image sensor to capture a fourth image frame according to the second plurality of capture parameters; and transmit the third image frame and the fourth image frame to the host processor.

The image signal processor may be configured to capture, consecutively, the first image frame based on the first plurality of capture parameters, the second image frame based on the second plurality of capture parameters, and a third image frame based on a the first plurality of capture parameters.

The image signal processor may be configured to capture, consecutively, two image frames based on the first plurality of capture parameters and two image frames based on the second plurality of capture parameters.

The first band may be an invisible light band and the second band may be in a visible light band.

The multi-channel image capture system may further include a focusable optical system configured to focus light onto the multi-channel image sensor, the first plurality of capture parameters may include a first focus setting and the second plurality of capture parameters may include a second focus setting, the image signal processor may be configured to control the focusable optical system in accordance with the first focus setting to focus light in the first band onto the multi-channel image sensor when capturing the first image frame and to control the focusable optical system in accordance with the second focus setting to focus light in the second band onto the multi-channel image sensor when capturing the second image frame.

The multi-channel image sensor may include a plurality of third pixels configured to detect light in a third band, and the image signal processor may be further configured to: store a third plurality of capture parameters; control the multi-channel image sensor to capture a third image frame according to the third plurality of capture parameters; and transmit the third image frame to a host processor.

The image signal processor may be further configured to compute the first plurality of capture parameters and the second plurality of capture parameters in accordance with an initial image captured by the multi-channel image sensor.

The first plurality of capture parameters may be calculated based on a quantum efficiency of the first pixels in the first band, a range in values of the initial image, and a power level supplied to a projection source configured to emit light in the first band.

The image signal processor may be further configured to receive the first plurality of capture parameters and the second plurality of capture parameters from the host processor.

The image signal processor may be configured to compute an aggregate image from the first image frame and the second image frame and configured to transmit the first image frame and the second image frame to the host processor as the aggregate image.

The image signal processor may be configured using a micro-script.

The image signal processor may be configured to receive the micro-script from the host processor.

According to one embodiment of the present invention, a method for controlling a multi-channel image capture system including a multi-channel image sensor including a plurality of first pixels configured to detect light in a first band and a plurality of second pixels configured to detect light in a second band different from the first band, includes: storing, by an image processor coupled to the multi-channel image sensor, a first plurality of capture parameters and a second plurality of capture parameters; controlling, by the image processor, the multi-channel image sensor to capture a first image frame according to the first plurality of capture parameters; controlling, by the image processor, the multi-channel image sensor to capture a second image frame according to the second plurality of capture parameters; and transmitting, by the image processor, the first image frame and the second image frame to a host processor.

The method may further include: capturing an initial image; computing the first plurality of capture parameters and the second plurality of capture parameters in accordance with quantum efficiencies of the first pixels in the first band and of the second pixels in the second band, the initial image, and a power level supplied to an illumination source.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

As discussed above in the background section, when using a multi-channel image sensor such as an RGB-IR sensor, the luminance of the light in a visible band of the electromagnetic spectrum may be significantly different from the luminance of the light in an invisible band of the spectrum (e.g., in the infrared range). Therefore, any given set of capture parameters or exposure parameters such as exposure time (shutter speed), aperture (f-stop), gain (ISO), and white balance may fail to yield good results for either at least some of the channels. This may be especially true in circumstances where the RGB-IR sensor is coupled to an infrared illumination source that provides controlled illumination of the scene.

In addition, cross-talk between the visible light channels and the invisible light channel can result in artifacts in the captured images.

According to aspects of embodiments of the present invention, a multi-channel image sensor is configured to capture multiple images with different capture parameters for the different channels. For example, a first set of parameters may be used for capturing visible light (RGB) images and a second set of parameters may be used for capturing invisible (e.g., IR) light images. In addition, aspects of embodiments of the present invention are directed to reducing the cross-talk between the visible light channels and the invisible light channel (or channels).

In addition, aspects of embodiments of the present invention are directed to combining a multi-channel image sensor configured to capture visible light and invisible light at different times with a projection source (or illumination source) that is precisely controllable to emit light only during the capture of particular frames of images. For example, the multi-channel image sensor can be controlled to capture visible light and invisible light during alternating frames (e.g., at a rate of 60 frames per second) and the projection source can be controlled to emit infrared light while the multi-channel image sensor is capturing a frame corresponding to the invisible light.

While embodiments of the present invention are described herein with respect to using one set of capture parameters for the invisible light channel and a second set of parameters for the visible light channels (e.g., the red, green, and blue channels), embodiments of the present invention are not limited thereto. For example, the data from each of the red, blue, and green pixels can be treated as a separate color channel (e.g., as a red channel, a blue channel, and a green channel) and may be captured in accordance with a different set of capture parameters (e.g., different capture parameters for the red, blue, and green channels). This may be desirable because the pixels may have different levels of sensitivity (e.g., different levels of quantum efficiency) to different bands of the electromagnetic spectrum (see, e.g., FIG. 1C comparing the quantum efficiencies of pixels configured to detect red, green, blue, and infrared light). In some systems, the difference in sensitivity between different channels is corrected by applying a per-channel gain. In embodiments of the present invention, the difference sensitivity between the different channels can also be corrected by using different capture parameters (e.g., parameters other than gain, such as aperture and shutter speed) for each channel. Similarly, the multi-channel sensor may be configured to capture multiple invisible light channels (e.g., an ultraviolet sub-channel, and near, far, short-wavelength, mid-wavelength, and long-wavelength infrared sub-channels), where each invisible light channel may use its own set of capture parameters. In addition, embodiments of the present invention are not limited to multi-channel sensors of the RGB-IR variety. For example, the multi-channel sensor may be a grayscale-IR sensor that only includes one type of band-pass filter within the visible range and one type of band-pass filter in the infrared range.

Figure 2:
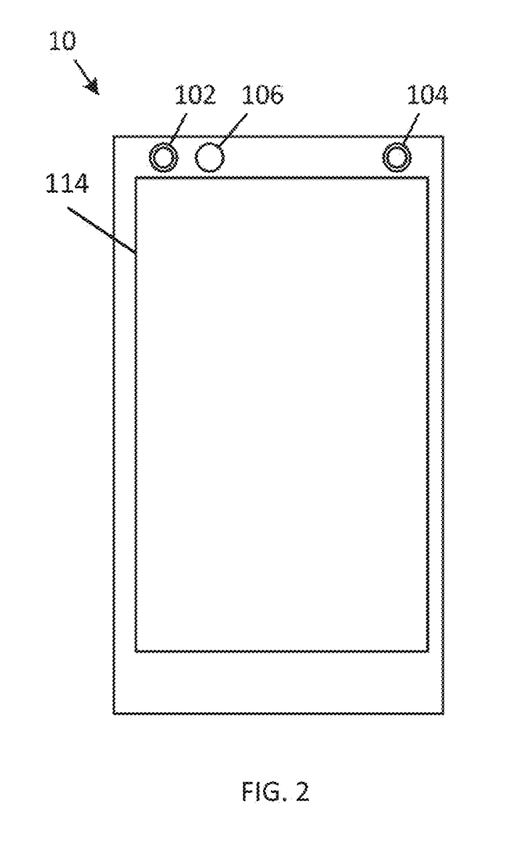
FIG. 2 is a diagram illustrating an image capture system according to one embodiment of the present invention integrated into a computing device.

FIG. 2 illustrates an image capture system according to one embodiment integrated into a computing device such as a mobile phone 10. As seen in FIG. 2, the image capture system includes a camera 102. The image capture system may also include a second camera 104, and a projection source 106. Although the image capture system is illustrated here as a being a component of mobile phone 10, embodiments of the present invention are not limited thereto and the image capture system may be included in other types of devices such as laptop and desktop computers, tablet computers, video game consoles, automatic teller machines, automobiles, surveillance systems, etc.

Figure 3:
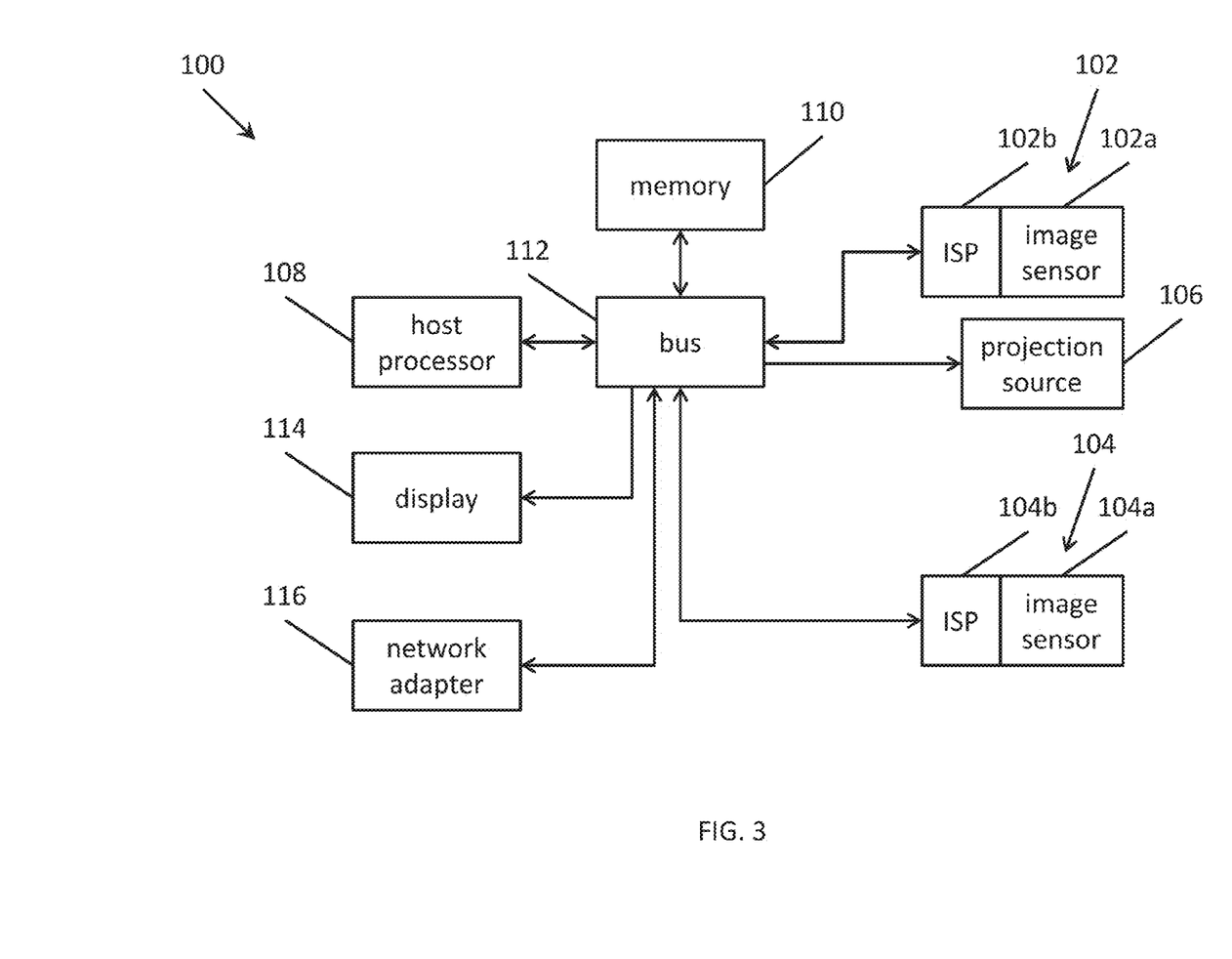
FIG. 3 is a block diagram illustrating an image capture system according to one embodiment of the present invention.

FIG. 3 is a block diagram illustrating an image capture system 100 according to one embodiment of the present invention. The image capture system 100 includes the camera 102. The image capture system 100 may also include a second camera 104, a projection source 106 (or illumination source), and a host processor 108 and memory 110, wherein the host processor may be a graphics processing unit (GPU), a more general purpose processor (CPU), an appropriately configured field programmable gate array (FPGA), or an application specific integrated circuit (ASIC). The various components may communicate with one another over a system bus 112. Additional components such as a display 114 and a network adapter 116 may also be coupled to the system bus to allow the device to display images and to communicate with other devices.

In embodiments that include the second camera 104, the second camera 104 and the first camera 102 may be calibrated to produce rectified images and may be registered (e.g., aligned) with respect to each other. The first camera 102 and the second camera 104 may also be mounted on a rigid platform to retain their respective registration after the calibration process.

Multiple multi-channel cameras such as the first multi-channel camera 102 and the second multi-channel camera 104 may be used together to support 3D reconstruction systems such as those described in "System And Method for 3D Reconstruction using Multiple Multi-Channel Cameras," U.S. patent application Ser. No. 14/641,092, filed in the United States Patent and Trademark Office on Mar. 6, 2015, the entire disclosure of which is incorporated herein by reference. Embodiments of the present invention may be used to supply input data to such systems, thereby improving the quality of the 3D reconstruction by providing data with reduced cross-talk between the multiple channels.

The cameras 102 and 104 may be located adjacent a same edge of the device, as shown in FIG. 2. In other embodiments, the cameras are located at different edges of the device (e.g., the first camera 102 may be located at an upper edge of the device and the second camera 104 may be located at a bottom edge of the device), thereby increasing the baseline (e.g., the distance between the cameras) and thereby allowing for longer range applications due to increased disparity between the cameras. The cameras 102 and 104 may also include optical components such as a focusable lens and a controllable aperture.

As used herein, the term "camera" refers to a component that includes an image sensor and an image signal processor coupled to the image sensor, where the image signal processor is configured to: control the image sensor; perform image processing calculations; and transmit data to a host processor over a bus. The image sensor may be a multi-channel charge coupled device (CCD) or complementary metal oxide semiconductor (CMOS) image sensor such as an RGB-IR sensor, as described above, and the image signal processor may be implemented in any of a variety of physical devices including, but not limited to, a microcontroller, a field programmable gate array (FPGA), a digital signal processor (DSP), etc. The image signal processor may be coupled directly to the image sensor without an intervening peripheral bus. As such, the first camera 102 may include an image sensor 102a and an image signal processor (ISP) 102b. Similarly, the second camera 104 may include an image sensor 104a and an image signal processor (ISP) 104b. The image signal processor is configured to control its associated image sensor (e.g., image signal processor 102b is configured to control image sensor 102a and image signal processor 104b is configured to control image sensor 104a). In some embodiments, two image sensors 102a and 104b are connected to and controlled by a same image signal processor.

For example, the image signal processor may be configured to control the image sensor to reset its pixels, control an exposure time (e.g., the time between resetting the pixels and reading out the pixels), read the image data stored in the pixels, and process the image data before transmitting the image data to the host processor 108 and/or the memory 110 via the bus 112. The processing of the image data may include, for example, adjusting the white balance of the image and adjusting the gain (e.g., sensitivity or ISO) of the image data. Characteristics of the captured image are controlled by these various parameters (exposure time, aperture, gain, white balance, etc.), and these parameters will be referred to herein as "capture parameters." These capture parameters are adjusted in accordance with the scene being imaged. For example, brighter scenes may use shorter exposure times, smaller apertures, and/or lower gain while darker scenes may use longer exposure times, larger apertures, and/or higher gain. In addition, white balance may be used to adjust the relative weights of various channels (e.g., the red, blue, and green channels) based on the color temperature of the illumination of the scene (e.g., whether the scene is in daylight or illuminated by fluorescent lights). Furthermore, in embodiments of the present invention in which the camera includes optical elements with a controllable focus, the capture parameters may further include a focus setting in order to focus the optical elements differently for the different channels. For example, different focus settings may be used a visible light frame than in an infrared frame due to differences in the refraction of the light through the optical elements.

The image capture system 100 may also include a projection source 106 that is configured to project a pattern in an area within the field of view of the camera 102 (or cameras 102 and 104). The projection source 106 may emit light in an invisible portion of the spectrum, such as in the infrared (IR) band. Alternatively, the projection source may emit light in both the invisible portion of the spectrum and the visible portion of the spectrum and may be controlled to vary the power of the light emitted in each portion of the spectrum.

In embodiments including multiple cameras 102 and 104, the projection source 106 is located between the first camera 102 and the second camera 104. The projection source 106 may be collinear with the first and second cameras 102 and 104 or may be non-collinear the first camera and the second camera. The projection source 106 may be in an offset position such that it is closer to one of the cameras than to the other camera (e.g., closer to the first camera than the second camera).

According to one embodiment of the present invention, the projection source 106 projects spatially encoded light onto a scene to improve 3D reconstruction in substantially non-textured or repetitively textured surfaces. Spatial encoding only requires capture at one point in time and therefore is suitable for the detection of the depth of moving objects. In other embodiments of the present invention, the projection source 106 projects diffuse light (e.g., substantially uniform light). The projection source 106 may project light in the invisible spectrum (e.g., in the IR spectrum, with substantially no energy in the visible light spectrum) in order to reduce impact on users of the system. In an RGB-IR camera, the IR channel can be used to capture reflection of the invisible illumination.

As discussed above, when using a multi-channel image sensor, it is possible to identify two different groups of pixels (e.g., RGB pixels and IR pixels) that aim at acquiring data in different spectra. High quality or optimal acquisition of information in each of these spectra may be characterized by different capture parameters (e.g., one exposure time for the RGB pixels and a different exposure time for the IR pixels). Aspects of embodiments of the present invention are directed to reducing cross-talk between visible light and invisible light channels.

According to one aspect of embodiments of the present invention, different channels are isolated by separating their acquisition in time. For example, visible light (e.g., color or RGB) information may be acquired during one frame while invisible light (e.g., infrared) information is acquired during a different frame. In one embodiment, these visible light and invisible light frames are acquired in alternating frames or consecutively interleaved (e.g., one frame of visible light data followed immediately by one frame of invisible light data, followed immediately by one frame of visible light data, and so on).

In other embodiments of the present invention, the visible light frames and the invisible light frames may be interleaved in various arrangements. For example, two consecutive visible light frames may be followed by two consecutive invisible light frames which may be followed by two consecutive visible light frames, and so on. As another example, there may be two visible light frames followed by one invisible light frame, followed by two visible light frames, and so on.

By applying an interleaved approach in which visible light data is captured separately in time from invisible light data, the capture parameters can be independently adjusted for the conditions in the scene for each portion of the captured spectrum. For example, visible light frames can be captured using a set of visible light capture parameters and invisible light frames can be captured with a separate set of invisible light parameters.

Some image sensor designs may require all pixel data to be read out of the image sensor during each frame. In such circumstances, the data corresponding to some pixels may be discarded or ignored. For example, when capturing a visible light frame, data corresponding to IR pixels may be discarded and when capturing an invisible light frame, data corresponding to the visible light pixels may be discarded.

In other embodiments of the present invention, the image sensor may be controlled to only output data corresponding to the pixels being read for the frame (e.g., the image sensor may be controlled to only output data from IR pixels when capturing an invisible light frame and to output only data from the RGB pixels when capturing a visible light frame), by selectively reading only from particular rows and columns of the image sensor.

In still other embodiments of the present invention, in frames captured using the invisible light capture parameters, the visible light data may be combined with the invisible light data. Similarly, in frames captured using the visible light capture parameters, the invisible light data may be combined with the visible light data. As such, data from channels other than the channel that the capture parameters have been calculated for may also contribute information to the captured frame.

According to one embodiment of the present invention, cross talk between the visible light data and the invisible light data can be reduced by controlling the projection source 106 to emit light only while invisible light frames are being captured. For example, in one embodiment of the present invention using a projection source 106 that emits infrared light and a multi-channel image sensor 102a configured to capture infrared light in one of its channels, the projection source 106 emits infrared light (e.g., coded infrared light) only during periods when a frame corresponding to infrared light is being captured and the projection source 106 is turned off during other frames (e.g., turned off during frames when visible light is being captured). Therefore, embodiments of the present invention allow an invisible light projection source to improve lighting during invisible light frames without adversely affecting visible light frames. In addition, the projection source 106 may be configured to emit invisible light (e.g., infrared light) at sufficient power to dominate the effects of ambient light during the capture of invisible light frames.

In order to reduce the average amount of energy emitted by the projection source 106, the projection source 106 may be configured to emit light only for a short amount of time such that the amount of energy emitted is characterized by very short spikes. The average power consumed by the projection source 106 is low because it is turned off for the majority of the time (e.g., it has a low duty cycle). These spikes of energy are synchronized with the acquisition of corresponding frames (e.g., short emissions of infrared light by the projection source 106 are synchronized with corresponding captures by infrared pixels of the image sensor) and the projection source 106 is turned off at all other times, such as times when the image sensor 102a is capturing data in a channel or channels other than the channel in which the projection source emits light. The emission time is commensurate with, for example, the power of the projection source 106, the range to the subject (or target object) to be illuminated by the projection source 106, and the albedo of the subject (or target object). In addition, the frame rate of the camera (e.g., 30 frames per second or 60 frames per second) may set an upper limit on the emission time. Generally, embodiments of the present invention may use an emission time in the range of 1 ms to 10 ms.

In such an arrangement, the invisible light pixels are used with a very short exposure time that is controlled by the emission time of the projection source 106, whereas the capture parameters of the visible light pixels (including the exposure time) will depend on the ambient visible light conditions.

Because the capture parameters may differ significantly for the visible light frames and invisible light frames, one aspect of embodiments of the present invention is directed to setting the capture parameters in accordance with the channel being captured and the current conditions of that channel. The various channels may use different capture parameters because, as discussed above, pixels may have different levels of quantum efficiency in different portions of the spectrum (e.g., different channels or different ranges of wavelengths). For example, the quantum efficiency of a pixel for a green channel may be greater than 95% whereas the quantum efficiency of the same pixel for the near infrared may be less than 50% (see, e.g., FIG. 1C).

In some embodiments, the host processor 108 may execute instructions for controlling the capture parameters on a frame-by-frame basis. In such embodiments, the host processor 108 sends capture parameters to the camera 102 before each frame to configure the camera 102 in accordance with the type of frame (visible or invisible) to be captured and based on the current conditions (e.g., ambient light levels, projection source power level, etc.). The capture parameters may also include parameters to control the post-processing of the image sensor data by the image signal processor 102b such as white balance adjustment.

In some circumstances, however, gathering and setting the necessary parameters by the host processor 108 during every frame introduces overhead and delay (for example, commands from the host processor 108 to the camera 102 traverse the bus 112).

According to one embodiment of the present invention, the image signal processor 102b is configured to store a plurality of sets of capture settings and cycle between the stored capture settings without additional direct control (e.g., frame-by-frame control) from the host processor 108. Generally, when considering the channels (e.g., the visible and infrared channels) separately, the calculated values of the capture parameters for each channel usually change slowly because sudden changes in illumination in the considered channel are rare and when sudden changes occur, slow adaptations to these changes are usually tolerable.

Therefore, according to one embodiment of the present invention, the logic governing every-frame switching between capture parameters (e.g., RGB capture parameters and IR capture parameters) is separated from logic for computing changes to those parameters (e.g., based on changing lighting conditions). In particular, in one embodiment, storing and setting capture parameters at the image signal processor 102b can reduce or eliminate the delay and overhead in changing the capture parameters on a frame-by-frame basis while changes to the parameters may be computed by the host processor 108.

In particular, the image signal processor 102b can manage the switch of the capture parameters at each frame in order to properly expose the visible light (RGB) or the infrared pixels during their corresponding frames. For example, at any switch from an RGB to an IR frame (or vice-versa), the image signal processor 102b sets the capture parameters to the set of values stored for that channel or channels. If there is a need to update the capture parameters due, for example, to changes in lighting conditions, then the host processor 108 can transmit updated capture parameters to the image signal processor 102b.

According to one embodiment of the present invention, the image signal processor 102b is programmed with "micro-scripts." Micro-scripts are programming code implemented at the sensor level (or sensor controller level) that allow logic to be applied on a per-pixel or per-pixel-group basis. For example, in an image signal processor 102b implemented by a microcontroller, a micro-script may be a program loaded into the memory of the microcontroller (e.g., memory local to the image signal processor). The memory of the microcontroller also stores a plurality of capture parameters and the micro-script would apply the stored capture parameters to adjust the capture settings on a frame-by-frame basis. The micro-script may also include instructions to receive capture parameters from the host processor 108 and to store those new capture parameters in the memory. However, embodiments of the present invention are not limited to implementations of an image signal processor 102b using a microcontroller. As discussed above, the image signal processor 102b may be implemented using a variety of types of programmable hardware such as a DSP or an FPGA.

Figure 4:
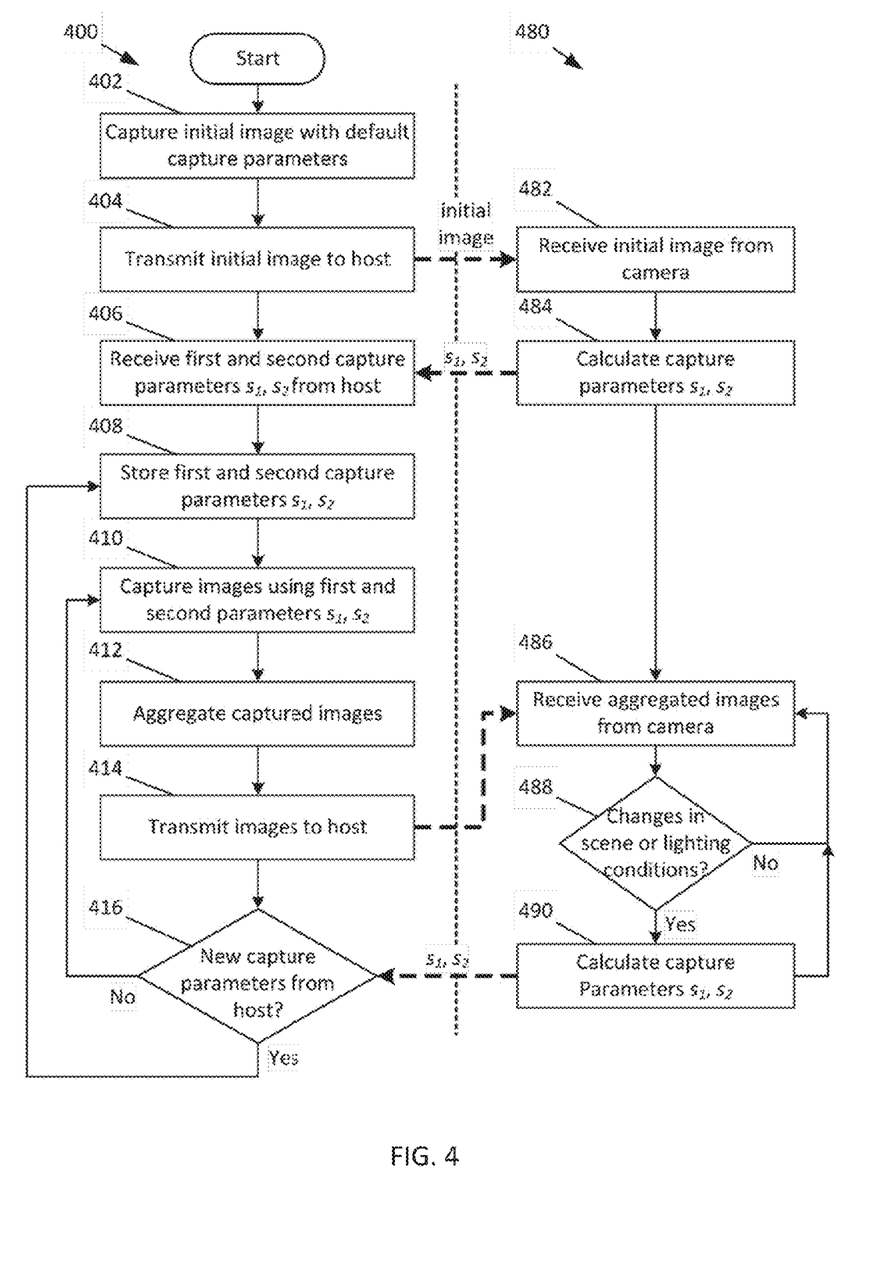
FIG. 4 is a flowchart illustrating a method for controlling image sensor capture parameters according to one embodiment of the present invention.

FIG. 4 is a flowchart illustrating a method for capturing images using different capture parameters for different channels according to one embodiment of the present invention. As shown in FIG. 4, in one embodiment of the present invention, the image signal processor 102 performs some of the operations 400 while the host processor 108 performs other operations 480. In more detail, when the image capture process begins, in operation 402 the image signal processor 102b controls the multi-channel image sensor 102a to capture an initial image using a set of default capture parameters. In operation 404, the image signal processor 102b transmits the initial image (including data from all of the channels of the multi-channel sensor 102a) to the host processor 108 and proceeds to wait to receive a response from the host processor 108 in operation 406.

In operation 482, the host processor 108 receives the initial image from the camera and, in operation 484, calculates a first set of capture parameters ($s_1$) for a first channel of the initial image and a second set of capture parameters ($s_2$) for a second channel of the initial image. These capture parameters may be calculated based on scene ambient illumination, artificial illumination (e.g., from the projection source 106) contrast, saturation, over-exposure, under-exposure, motion, object reflectivity, etc. For example, $s_1$ may include a shorter exposure time (or faster shutter speed) for the infrared channel and the $s_2$ may include a longer exposure time for the visible channels in low light situations where the projection source 106 is providing artificial infrared illumination. The host processor 108 then transmits the parameters $s_1$ and $s_2$ to the image signal processor 102b.

In operation 406, the image signal processor 102b receives the parameters $s_1$ and $s_2$ from the host processor 108 and, in operation 408, stores the parameters in its local memory. In operation 410, the image signal processor 102b controls the image sensor 102a to capture multiple images using the first and second capture parameters $s_1$ and $s_2$. For example, an invisible light frame may be captured using the first capture parameters $s_1$ and a visible light frame may subsequently be captured using second capture parameters $s_2$.

In operation 412, the image signal processor 102b may aggregate the captured images (e.g., the invisible light frame and the visible light frame) and then transmit the aggregated images to the host in operation 414. In some embodiments of the present invention, the visible light frame and the invisible light frame are kept separate (not aggregated) when sent to the host. In other embodiments of the present invention, more than two images are aggregated together before transmitting the images to the host processor 108.

In operation 486, the host processor 108 may receive the captured images or the aggregated images from the camera 102 (e.g., from the image signal processor 102b of the camera 102). The images may be stored in memory 110 for use by other applications executed by the host processor (e.g., gesture detection applications) or for viewing on the display 114 or transmission to another device via the network adapter 116. The host processor 108 may then analyze the images in operation 488 to determine if there have been significant changes in the scene or in the lighting conditions (e.g., moving from daylight into shadow, turning on a lamp, etc.). If not, then the host processor 108 returns to operation 486 to await additional images from the camera. If the host processor 108 does detect significant changes, then the host processor calculates new capture parameters $s_1$ and $s_2$ in operation 490 and transmits the new capture parameters to the image signal processor 102b. In some embodiments, when less than all of the sets of capture parameters need to be updated, only the sets of capture parameters that have changed are transmitted to the image signal processor 102b.

In operation 416, if the image signal processor 102b detects new capture parameters from the host processor, then the image signal processor 102b receives and stores the parameters in operation 408 and continues to capture images in operation 410. If no new capture parameters are received, then the image signal processor 102b continues directly to capture images using the previously stored parameters.

As discussed above, in operation 412, the image signal processor 102b may be configured to aggregate the captured images. This can produce more useful images because the channels are well separated and characterized by different settings (e.g., first capture parameters $s_1$ for invisible light or infrared frames and second capture parameters $s_2$ for visible light or RGB frames). In the following example, aggregation of RGB and IR data will be described in the case of a multi-channel sensor 102a capable of acquiring RGB data with settings $s_2$ and IR data with settings $s_1$ coupled to a projection source 106 configured to produce diffuse infrared illumination. However, embodiments of the present invention are not limited to combining RGB and IR data and may also be applied to combining different sets of channels or sub-channels, such as combining the red, green, blue, and infrared channels separately (rather than grouping the red, green, and blue channels together) or by combining the data with data from other portions of the electromagnetic spectrum.

In a very bright scenario, the acquired RGB frame (or RGB image) can be used for visualization or further processing because there is sufficient contrast within the image. However, in a very dark scenario, the acquired RGB image contains little or no information suitable for visualization or further processing while the IR frame (or IR image) may contain useful information. The RGB and IR frames can be combined using, for example, a linear on non-linear combination of the RGB and IR information in each pixel, and the parameters controlling the combination are a function of the illumination in the RGB and IR spectra. In addition, because the capture parameters $s_1$ and $s_2$ are functions of the IR and RGB spectra, respectively, it is possible to use the values of the capture parameters $s_1$ and $s_2$ to control the combination of the RGB and IR information.

In one embodiment, an aggregate image A is generated from an RGB image C and an IR image I, where the value of each pixel having coordinates (i,j) can be computed as:

$$A(i,j)=f(C,I,s_1,s_2,i,j)$$

where f is a generic function. In a simple case, A(i,j) can be computed as a linear combination of C(i,j) and I(i,j):

$$A(i,j)=c*C(i,j)+(1-c)*I(i,j)$$

in which the parameter c is a function of $s_1$ and $s_2$:

$$c=g(s_1,s_2)$$

where $0 \le g(s_1, s_2) \le 1$. In some embodiments, c may be computed on a pixel by pixel basis (e.g., c and g may also be functions of coordinates i and j) and may be computed to maximize the contrast in the image (or in particular portions of the image), scale the data to use the entire dynamic range of the system, or scale the data to highlight a particular portion of the image containing a feature of interest (e.g., a pattern projected by the projection source 106).

In some embodiments, at some pixel locations c (or $g(s_1, s_2)$) may be 0 or 1. In such pixels, data is only included from frames that were captured with corresponding capture parameters. For example, in the case of an RGB-IR camera, c may be chosen on a frame-by-frame and pixel-by-pixel basis such that the contributions of the R, G, and B pixels are accounted for in frames in which the capture parameters are calculated for the visible spectrum (e.g., set to maximize the quality of the acquisition to the visible spectrum), while the contribution of the IR pixels is accounted only for in the frames in which the acquisition parameters are calculated for the invisible spectrum (e.g., set to maximize the quality of the IR acquisition).

In addition, because C and I are generally not relative to the same exposure interval, it is possible to extend the same reasoning to a framework in which timing considerations are applied for the computation of aggregated image A from a set of consecutively acquired RGB and IR images, based, for instance, on optical flow or image interpolation techniques.

While embodiments of the present invention are described above with respect to systems using two sets of capture parameters $s_1$ and $s_2$, embodiments of the present invention are not limited thereto and may be implemented using more than two sets of capture parameters. For example, an image signal processor 102b may be configured to store four sets of capture parameters $s_1$, $s_2$, $s_3$, and $s_4$. The first two sets of capture parameters, $s_1$ and $s_2$, may be computed to capture useful infrared light images at different exposures and the secondo two sets of capture parameters, $s_3$ and $s_4$, maybe used to capture useful visible light images at different exposures. Capturing images at multiple exposures allows the synthetic expansion of the dynamic range of the image sensor 102a, where one exposure captures information about the dimly lit portions of the scene and another exposure captures information about the brightly lit portions of the same scene.

As discussed above, these frames may be interleaved in various ways, such as: two infrared frames captured with capture parameters $s_1$ and $s_2$ followed by two visible light frames captured with capture parameters $s_3$ and $s_4$; or one infrared frame captured with capture parameters $s_1$, one visible light frame captured with capture parameters $s_3$, one infrared frame captured with capture parameters $s_2$, and one visible light frame captured with capture parameters $s_4$.

As noted above, the aggregate image A can be a linear combination or a non-linear combination of the captured frames. When combining more than two frames of data, a linear combination of n visible light image frames C and m invisible light image frames I can be generalized:

$$A(i,j) = \sum_{k=1}^{n} c_k * C_k(i,j) + \sum_{l=1}^{m} d_l * I(i,j)$$

where $\sum_{k=1}^{n} c_k + \sum_{l=1}^{m} d_l = 1$.

Furthermore, while embodiments of the present invention are described with respect to using one set of capture parameters for all of the visible light channels (e.g., treating them as one channel) and a separate set of parameters for the invisible light data, embodiments of the present invention are not limited thereto. For example, the red, blue, and green channels may be treated separately and the sensor may be configured to capture invisible light in multiple invisible light channels. In addition, higher energy light such as ultraviolet light may be used as another channel. Each of these channels may be captured using its own set of capture parameters s and the aggregation of the image frames from multiple channels using linear or non-linear combinations, as described above, can be further extended to accommodate more than two channels.

As such, embodiments of the present invention are directed to systems and methods for acquiring information in multiple channels using different sets of capture parameters. For example, visible light (e.g., RGB) data and invisible light (e.g., infrared) data can be captured using the same sensor but with different capture parameters for the two types of data. The ability to capture images with different capture parameters is particularly useful when using a controllable external projection source to illuminate the scene in the invisible portion of the spectrum (e.g., when using an infrared light source) because, in some embodiments of the present invention, the controllable invisible light projection source is synchronized with the capture of data in the invisible light channel (or channels) and projects light only when the image sensor is capturing data for the invisible light channel (or channels). As such, effects of the external projection source on the capture of data in the visible light channel (or channels) are reduced or eliminated.

Embodiments of the present invention also allow an increase in the effective dynamic range of the camera by using multiple image captures with different capture parameters and updating the capture parameters based on the scene and ambient illumination characteristics.

Embodiments of the present invention allow the efficient capture of frames of data using different capture parameters by using the image signal processor of the camera both to store the sets of capture parameters and to cycle between the stored captured parameters. The logic performed to cycle through the sets of capture parameters can be performed by micro-scripts implemented at the hardware level (e.g., in the image signal processor) of the camera.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A multi-channel image capture system comprising:
a multi-channel image sensor comprising a plurality of first pixels configured to detect light in a first band and a plurality of second pixels configured to detect light in a second band different from the first band;
an image signal processor coupled to the multi-channel image sensor, the image signal processor being configured to:
store a first plurality of capture parameters and a second plurality of capture parameters;
control the multi-channel image sensor to capture a first image frame according to the first plurality of capture parameters;
control the multi-channel image sensor to capture a second image frame according to the second plurality of capture parameters; and
transmit the first image frame and the second image frame to a host processor
a projection source configured to emit light in the first band and not in the second band;
the host processor; and
a memory storing instructions that, when executed by the host processor, cause the host processor to:
control the projection source to emit light in the first band while the multi-channel image sensor captures the first image frame according to the first plurality of capture parameters.

2. The multi-channel image capture system of claim 1, wherein the memory further stores instructions that, when executed by the host processor, cause the host processor to:
control the projection source to stop emitting light in the first band while the multi-channel image sensor captures the second image frame according to the second plurality of capture parameters.

3. The multi-channel image capture system of claim 2, wherein the projection source is configured to emit no light in the second band.

4. The multi-channel image capture system of claim 2, wherein the projection source is configured to emit light at a first power level in the first band and to emit light at a second power level in the second band.

5. The multi-channel image capture system of claim 1, further comprising a second multi-channel image sensor comprising a plurality of first pixels configured to detect light in the first band and a plurality of second pixels configured to detect light in the second band.

6. The multi-channel image capture system of claim 5, further comprising a second image signal processor, the second image signal processor being configured to:
store the first plurality of capture parameters and the second plurality of capture parameters;
control the second multi-channel image sensor to capture a third image frame according to the first plurality of capture parameters;
control the second multi-channel image sensor to capture a fourth image frame according to the second plurality of capture parameters; and
transmit the third image frame and the fourth image frame to the host processor.

7. The multi-channel image capture system of claim 1, wherein the image signal processor is configured to capture, consecutively, the first image frame based on the first plurality of capture parameters, the second image frame based on the second plurality of capture parameters, and a third image frame based on a the first plurality of capture parameters.

8. The multi-channel image capture system of claim 1, wherein the image signal processor is configured to capture, consecutively, two image frames based on the first plurality of capture parameters and two image frames based on the second plurality of capture parameters.

9. The multi-channel image capture system of claim 1, wherein the multi-channel image sensor comprises a plurality of third pixels configured to detect light in a third band, and
wherein the image signal processor is further configured to:
store a third plurality of capture parameters;
control the multi-channel image sensor to capture a third image frame according to the third plurality of capture parameters; and
transmit the third image frame to a host processor.

10. The multi-channel image capture system of claim 1, wherein the image signal processor is further configured to receive the first plurality of capture parameters and the second plurality of capture parameters from the host processor.

11. The multi-channel image capture system of claim 1, wherein the image signal processor is configured using a micro-script.

12. The multi-channel image capture system of claim 11, wherein the image signal processor is configured to receive the micro-script from the host processor.

13. A multi-channel image capture system comprising:
a multi-channel image sensor comprising a plurality of first pixels configured to detect light in a first band and a plurality of second pixels configured to detect light in a second band different from the first band; and
an image signal processor directly coupled to the multi-channel image sensor, the image signal processor being configured to:
store a first plurality of capture parameters and a second plurality of capture parameters;
control the multi-channel image sensor to capture a first image frame according to the first plurality of capture parameters;
control the multi-channel image sensor to capture a second image frame according to the second plurality of capture parameters; and
transmit the first image frame and the second image frame to a host processor,
wherein the first band is an invisible light band and the second band is in a visible light band.

14. A multi-channel image capture system comprising:
a multi-channel image sensor comprising a plurality of first pixels configured to detect light in a first band and a plurality of second pixels configured to detect light in a second band different from the first band;
an image signal processor directly coupled to the multi-channel image sensor, the image signal processor being configured to:
store a first plurality of capture parameters and a second plurality of capture parameters;
control the multi-channel image sensor to capture a first image frame according to the first plurality of capture parameters;
control the multi-channel image sensor to capture a second image frame according to the second plurality of capture parameters; and
transmit the first image frame and the second image frame to a host processor; and
a focusable optical system configured to focus light onto the multi-channel image sensor, wherein the first plurality of capture parameters comprises a first focus setting and the second plurality of capture parameters comprises a second focus setting, wherein the image signal processor is configured to control the focusable optical system in accordance with the first focus setting to focus light in the first band onto the multi-channel image sensor when capturing the first image frame and to control the focusable optical system in accordance with the second focus setting to focus light in the second band onto the multi-channel image sensor when capturing the second image frame.

15. A multi-channel image capture system comprising:
a multi-channel image sensor comprising a plurality of first pixels configured to detect light in a first band and a plurality of second pixels configured to detect light in a second band different from the first band; and
an image signal processor directly coupled to the multi-channel image sensor, the image signal processor being configured to:
store a first plurality of capture parameters and a second plurality of capture parameters;
control the multi-channel image sensor to capture a first image frame according to the first plurality of capture parameters;
control the multi-channel image sensor to capture a second image frame according to the second plurality of capture parameters; and
transmit the first image frame and the second image frame to a host processor; and
wherein the image signal processor is further configured to compute the first plurality of capture parameters and the second plurality of capture parameters in accordance with an initial image captured by the multi-channel image sensor.

16. The multi-channel image capture system of claim 15, wherein the first plurality of capture parameters are calculated based on a quantum efficiency of the first pixels in the first band, a range in values of the initial image, and a power level supplied to a projection source configured to emit light in the first band.

17. A multi-channel image capture system comprising:
a multi-channel image sensor comprising a plurality of first pixels configured to detect light in a first band and a plurality of second pixels configured to detect light in a second band different from the first band;
an image signal processor directly coupled to the multi-channel image sensor, the image signal processor being configured to:
store a first plurality of capture parameters and a second plurality of capture parameters;
control the multi-channel image sensor to capture a first image frame according to the first plurality of capture parameters;
control the multi-channel image sensor to capture a second image frame according to the second plurality of capture parameters; and
transmit the first image frame and the second image frame to a host processor; and
wherein the image signal processor is configured to compute an aggregate image from the first image frame and the second image frame and configured to transmit the first image frame and the second image frame to the host processor as the aggregate image.

18. A method for controlling a multi-channel image capture system comprising a multi-channel image sensor comprising a plurality of first pixels configured to detect light in a first band and a plurality of second pixels configured to detect light in a second band different from the first band, the method comprising:
storing, by an image processor directly coupled to the multi-channel image sensor, a first plurality of capture parameters and a second plurality of capture parameters;
controlling, by the image processor, the multi-channel image sensor to capture a first image frame according to the first plurality of capture parameters;
controlling, by the image processor, the multi-channel image sensor to capture a second image frame according to the second plurality of capture parameters;
transmitting, by the image processor, the first image frame and the second image frame to a host processor;
capturing an initial image; and
computing the first plurality of capture parameters and the second plurality of capture parameters in accordance with quantum efficiencies of the first pixels in the first band and of the second pixels in the second band, the initial image, and a power level supplied to an illumination source.

* * * * *